Oct. 21, 1930.  F. X. TEMMEN  1,779,253
APPARATUS FOR BACKING ELECTROTYPES
Filed Aug. 9, 1929   7 Sheets-Sheet 5

Oct. 21, 1930.  F. X. TEMMEN  1,779,253
APPARATUS FOR BACKING ELECTROTYPES
Filed Aug. 9, 1929  7 Sheets-Sheet 7

Frank X. Temmen,
INVENTOR,
BY
ATTORNEY

Patented Oct. 21, 1930

1,779,253

UNITED STATES PATENT OFFICE

FRANK X. TEMMEN, OF COVINGTON, KENTUCKY, ASSIGNOR TO THE RAPID ELECTROTYPE COMPANY, OF CINCINNATI, OHIO, A CORPORATION OF OHIO

APPARATUS FOR BACKING ELECTROTYPES

Application filed August 9, 1929. Serial No. 384,556.

In making electrotypes it is the practice to first form a metal shell, as by electro-depositing copper upon a wax mold in which the reverse of the printing face which is to be formed on the electrotype has been impressed, the electrotype shell being electro-deposited on this mold by the electro-galvanic process, the obverse side of this shell forming the printing surface of the electrotype and the reverse side of the shell having reverse formations thereon, the shell being of substantially uniform thickness throughout and quite thin.

It is the practice to back this shell with a baser metal or compound of metals or materials by casting the same on the reverse side of the shell for strengthening the same and producing a plate of sufficient thickness so that the same may, after being suitably finished, be used either direct in the printing press or upon a wood or other base in the printing operation. The material with which the back of the shell is provided is usually a composition largely composed of lead, and is well known in the art, and may be of any suitable material adaptable for the purpose, and will be hereinafter referred to as backing metal.

Several steps are employed in the art as at present practiced in backing such shells, consisting first, in acid treating the reverse side of the shell so as to prepare the same for tinning; second, in tinning such reverse side for preparing the same for receiving the backing metal and having the backing metal adhere thereto and, third, in casting the backing metal upon the reverse side of the shell.

The shell is heated so that the same may be properly tinned and properly receive the backing metal, and afterwards cooled, so as to harden the same in order to be able to handle the same conveniently.

It is the object of my invention to provide a novel conveyor containing pans in which the shells are received and treated and in which the backings therefor are provided, and to provide novel means for operating said conveyor.

It is the object of my invention further to provide novel means for heating the shells, and novel means for cooling the same; further, to provide novel means for heating the pans during steps in the making of the electrotypes; further, to provide novel means whereby to cause coaction between the pans and a heating bath, to cause travel of the pans while being subjected to said bath, and to provide novel means for causing separation between said pans and the bath; further, to provide novel means for changing the elevation of the pans with relation to a heating bath, and further to provide novel control means for the latter.

It is the object of my invention further to provide novel means for controlling the flow of the backing material, to provide novel means for maintaining the shell level while the backing metal is fed thereon, to provide novel means for heating the backing material, and to provide novel means for heating the heating bath.

The invention will be further readily understood from the following description and claims, and from the drawings, in which latter:

My present invention is an improvement upon the apparatus shown, described and claimed in Letters Patent of the United States No. 1,183,105, granted to Joseph Nocheck, May 16, 1916, for apparatus for backing up electrotypes.

Figure 3:
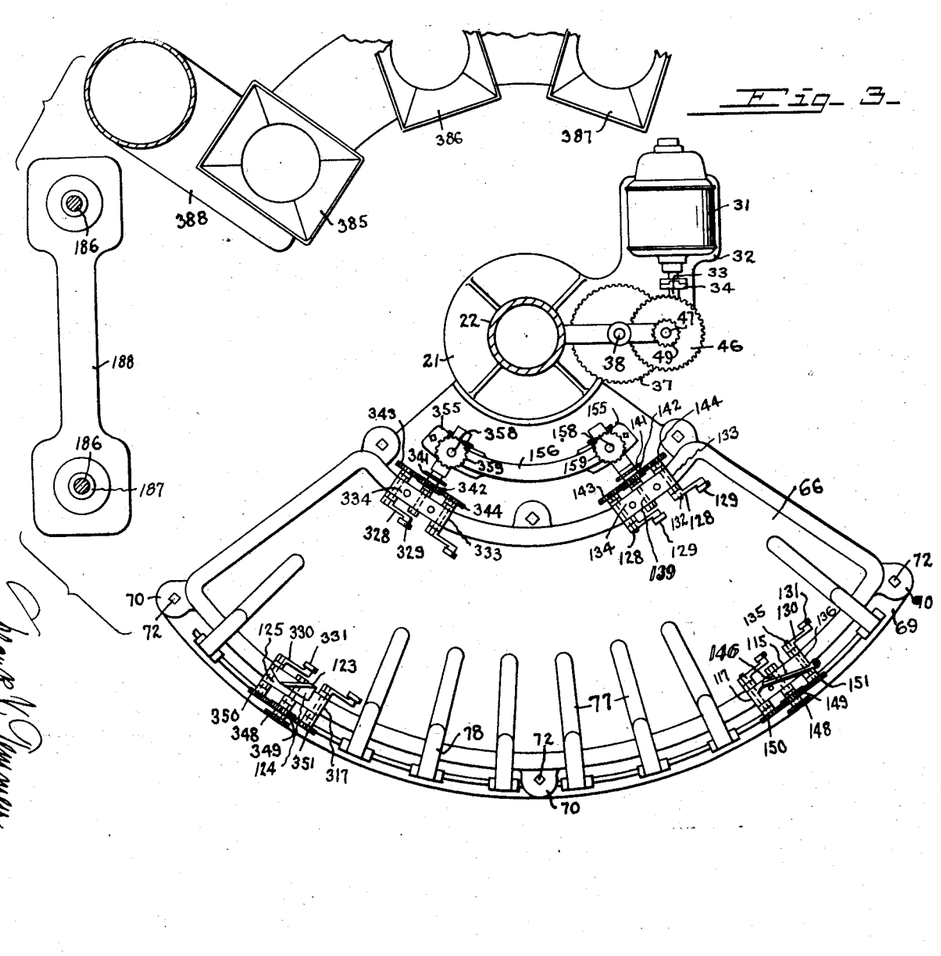
Fig. 3 is a plan section of the same, taken on the line 3—3 of Fig. 2, and partly broken away.
Figure 4:
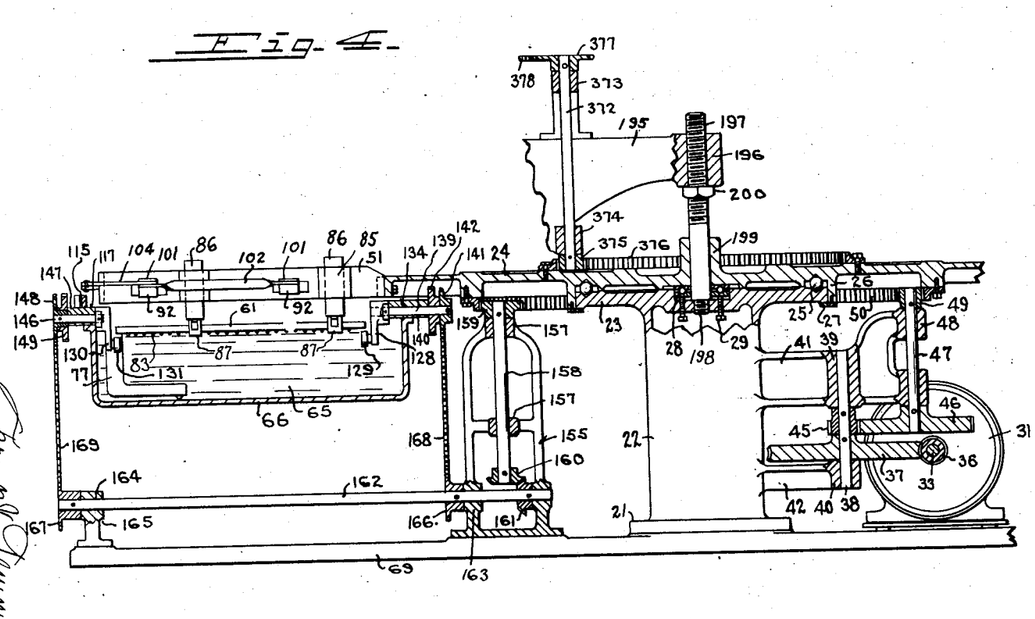
Fig. 4 is a vertical section of the same, taken on the irregular line 4—4 of Fig. 1, and partly broken away.

The frame of the machine comprises a base 21 and a pedestal 22 provided with an annular shelf 23. A turn-table 24, hereinafter also referred to as a rotary carrier, rotates on the pedestal. There is an annular ball-bearing 25 between the turn-table and the pedestal, the balls whereof are located in annular runways respectively in the shelf and in the turn-table. There is an annular guide 26 between the shelf and the turn-table, gibs 27 on the turn-table being received under the shelf for maintaining the turn-table on the pedestal. (Figs. 3 and 4.)

A ball-bearing 28 is located between the shelf and the turn-table adjacent to the axis of the latter, the lower raceway of this ball-bearing being supported by adjusting bolts 29 threaded in the shelf. (Fig. 4.)

Figure 2:
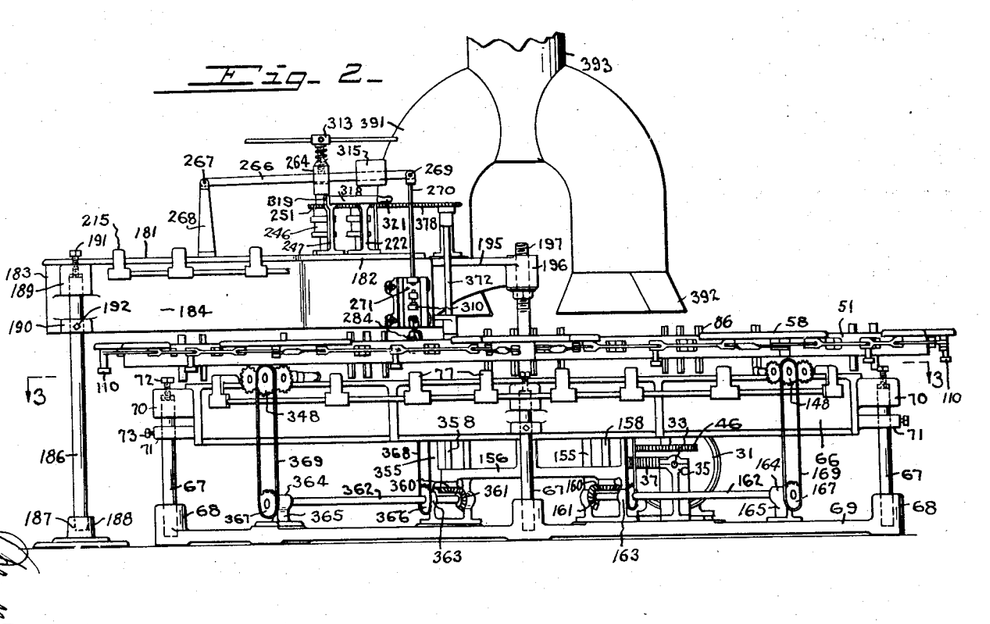
Fig. 2 is a front elevation of the same.

An electric motor 31 is mounted on a branch 32 of the base, the rotor of the electric motor having a drive-shaft 33 connected therewith by a coupling 34. The drive-shaft is journaled in bearings 35 on the branch of the base and has a worm 36 fixed thereon. The worm meshes with a worm-wheel 37 fixed to an upright shaft 38 journaled in bearings 39, 40, in brackets 41, 42, extending from the pedestal. (Figs. 2, 3 and 4.)

The shaft 38 has a pinion 45 fixed thereto which meshes with a gear 46 fixed to a shaft 47 journaled in bearings 48 on the bracket 41. A pinion 49 is fixed to the shaft 47 and meshes with an internal gear 50 on the lower face of the turn-table for rotating the turn-table. (Figs. 3 and 4.)

Figure 5:
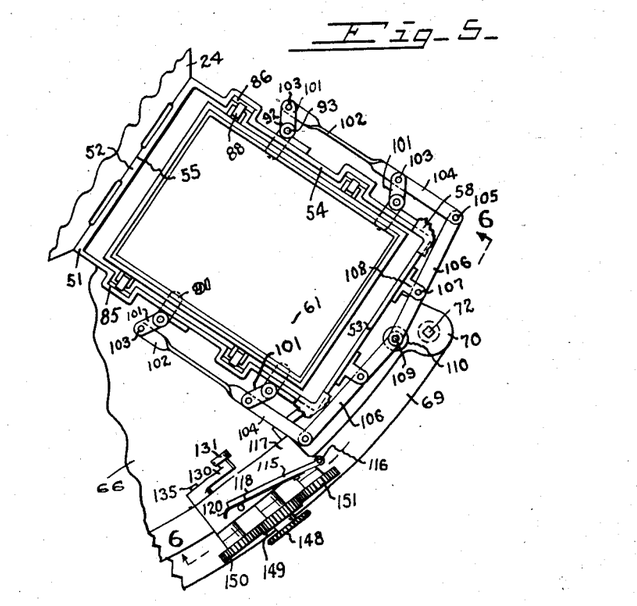
Fig. 5 is a plan view of a portion of the machine on an enlarged scale for better illustration of a portion of the pan supporting and actuating means, partly broken away.

The turn-table comprises frames 51 radially arranged on the turn-table. These frames comprise inner walls 52, outer walls 53 and side walls 54. The edge of the turn-table is provided with chord faces 55. The inner walls of the frames are clamped to these faces by suitable bolts. (Figs. 3, 4 and 5.)

There are a suitable number of these frames arranged about the turn-table, ten of the frames being shown. Angle-pieces 58 span the space between the outer proximate corners of adjacent frames and are fixed to said corners by suitable bolts. The inner portion of the turn-table, the frames and the angle pieces are thus rigidly secured together for forming a rigid turn-table.

Pans 61 are complemental to the respective frames and are arranged to be moved up and down therein with relation to the heating means for heating the pans. (Figs. 4 and 5.)

The heating means are exemplified as a molten bath 65 in a reservoir 66 shown of arcuate form and arranged under a portion of the path of the pans. It may be suitably heat insulated. The reservoir is supported by posts 67, the lower ends of which are supported in bearings 68 of a sector 69 of the base, which is fastened to the central portion of the base by suitable bolts. The reservoir 66 is provided with bearings 70, 71, in which the upper portions of the posts are received. The bearings 70 have upper walls provided with threaded openings in which adjusting bolts 72 are threaded, the lower ends of the adjusting bolts coacting with the upper ends of the posts, relative adjustment between the bolts causing leveling of the reservoir. Set-bolts 73 threaded in the bearings 71 are clamped against the posts after adjustment for fixing the parts in adjusted relation. (Figs. 2, 3, 4 and 5.)

The bath 65 in the reservoir is a heating bath and may be composed of a composition containing lead and be for instance the same metal as the backing metal of the electrotype, the composition of which is well-known in the art, or be of material similar to the backing material for the electrotype. The bath is maintained in molten state, for instance by means of electric heating elements 77 of usual or desirable construction, which are let into the bath, and comprise shanks 78 through which the electric conductors for the heating elements are received, these electric conductors connecting with a suitable source of electric energy, as a public service supply, and are controlled by suitable switches, and by suitable automatic temperature control means, suitably placed. (Figs. 2, 3 and 4.)

Figure 10:
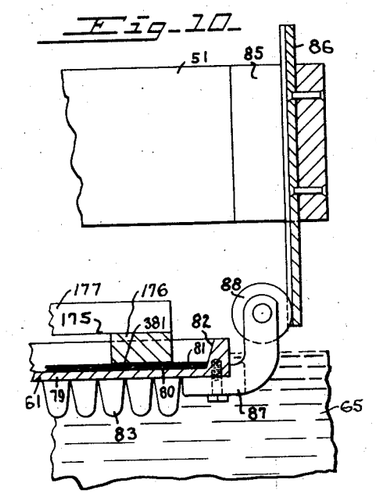
Fig. 10 is a vertical section of one of the pans in association with its bath, taken on the line 10—10 of Fig. 1, and partly broken away.

The pans 61 are preferably shallow pans having a bottom 79, the upper face of which is a plane for receiving the printing face 80 of the electro-deposited shell 81 and forming a plane surface for supporting said shell. (Figs. 4 and 10.)

The pans are comparatively shallow and are provided with edge walls 82 which are of a height at least as high as the desired height of the untrimmed electroplate after the backing has been poured on the shell. The inner faces of said walls are shown sloping upwardly and outwardly for ready release of the backed shell. (Fig. 10.)

The lower face of the pan is provided with projections 83 which are received in the molten bath for ready transference of the heat of the bath to the pans. The pans are preferably of a lighter material than the material of the bath so as to float on the bath with the upper margin of the pan above the level of the bath. The pans may for instance be of cast iron.

The side walls of the frames are provided with recesses 85 having upright guides 86 at their bottoms extending above and below the frames. The pans are provided with brackets 87 having guide rollers 88 thereon complemental to the guides for guiding the pans up and down in the frames. (Figs. 2, 5 and 10.)

Figure 11:
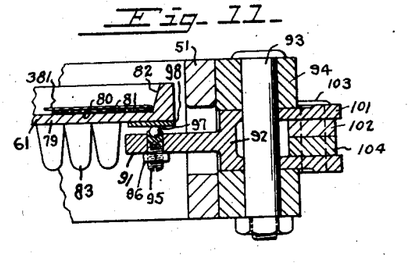
Fig. 11 is a vertical sectional detail view of the pan supporting means, taken on the line 11—11 of Fig. 1, and partly broken away.

The pans are normally held in up positions, being shown supported on fingers 91 of bell-crank levers 92 pivoted on pivot-pins 93 in bearings 94 on the frame 51. Supporting bolts 95 are adjustable in threaded holes in the fingers and held in adjusted positions by jam-nuts 96. The ends of the bolts are respectively provided with anti-friction balls 97 which are presented upwardly and are received under the pans for supporting the pans. The balls coact with hardened pads 98 on the lower faces of the pans to resist wear. There is preferably a supporting finger at each corner of the pan and the adjustments of the bolts 95 level the pan so that when backing material is flowed thereinto, the depth of the backing material will be equal throughout the pan for forming the printing plate of even thickness. (Figs. 5 and 11.)

Figure 6:
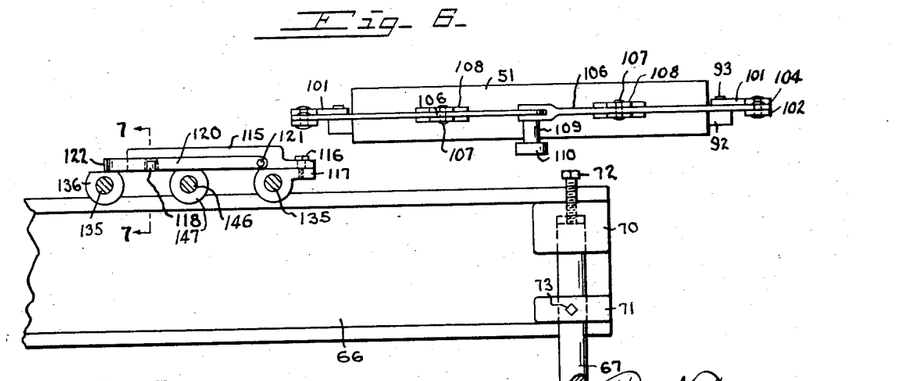
Fig. 6 is a front elevation of the same, partly in section on the line 6—6 of Fig. 5, and partly broken away.
Figure 7:
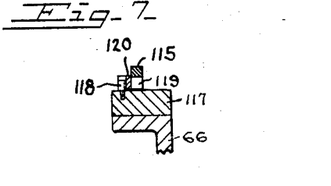
Fig. 7 is a vertical sectional detail view of the same, taken on the line 7—7 of Fig. 6.

The outer arms 101 of the bell-crank levers at the respective sides of the frame are connected by links 102 by means of pivot-pins 103. Links 104 are articulated with the links 102 by the pivot-pins 103 of the outer bell-crank levers and with articulating pins 105 of levers 106 pivoted on pivot-pins 107 in lugs 108 extending from the frame. The levers 106 of the respective frames extend toward each other. The proximate ends of the levers are interpivoted by a pivot-stud 109, the pivot-stud carrying a roller 110. The connections between the levers and the pivot-stud are sufficiently free to permit rocking movements of the levers. (Figs. 5, 6 and 11.)

The roller is arranged to engage a cam-piece 115 for moving the roller inwardly and thereby swinging the supporting fingers away from supporting relation with the pans for permitting the pans to descend. This cam-piece is shown pivoted at the beginning portion of the reservoir 66 on a pivot-pin 116 extending from a bearing-block 117, so that the respective pans may be released for lowering the same into the heating bath at the beginning portion of said bath. (Figs. 1, 3, 5 and 6.)

It is desired at times to permit the pans to travel above the bath without descent into the bath. The cam-piece is therefore arranged to be placed in inactive relation. For this purpose a retaining pin 118 is fixed in the bearing-piece and the cam-piece is provided with a notch 119 complemental to said pin, so that the cam-piece may be moved on its pivot past the pin, the notch passing the pin. An obstructing plate 120 is pivoted by a pin 121 to the cam-piece, and has a finger-part 122. (Figs. 5 and 6.) When it is desired to maintain the cam-piece in actuating relation, the obstructing plate is lowered on its pivot and placed between the obstructing pin 118 and the notch 119 for holding the cam-piece in actuating relation. When it is desired to put the cam-piece in inactive relation, the obstructing plate is raised away from the notch to permit retraction of the cam-piece.

The cam-piece 115 is arranged to move the supporting fingers for the pans into release relation at the beginning portion of the heating reservoir. A cam-piece 123 at the end portion of the reservoir is arranged to coact with the roller 110 for moving the fingers 91 into supporting relation. (Fig. 3.)

The cam-piece 123 extends upwardly from a plate 124 secured to a bearing-piece 125 by suitable bolts. (Fig. 3.) The roller 110 is arranged to be received against the outer face of the cam-piece 123 for moving the roller outwardly and thereby moving the fingers into pan supporting relation.

The means for lowering the pans into the molten bath and for raising the pans out of the molten bath are exemplified as arms rotating below the pans respectively at the beginning portion and at the end portion of the molten bath, for lowering the pans upon retraction of the supporting fingers at the beginning portion of the molten bath and for raising the pans at the end portion of the molten bath, the supporting fingers moving into supporting relation when the pans have been raised.

Inner arms 128 are provided with rollers 130

129 and outer arms 130 are provided with rollers 131. The arms 128 are secured to shafts 132 journaled in bearings 133 of a bearing-block 134 fixed to the inner wall of the reservoir. The arms 130 are fixed to shafts 135 journaled in bearings 136 of the bearing-block 117, secured to the outer wall of the reservoir. (Figs. 3, 5 and 6.)

A shaft 139 is journaled in a bearing 140 of the bearing-block 134 and has a sprocket-wheel 141 and a gear 142 fast thereon. The gear 142 meshes with gears 143, 144, respectively fast on the shafts 132. (Figs. 3 and 4.) A shaft 146 is journaled in a bearing 147 of the bearing-block 117 and has a sprocket-wheel 148 and a gear 149 fixed thereon. The gear 149 meshes with gears 150, 151, respectively on the shafts 135. (Figs. 3, 4, 5 and 6.)

Similar arms, shafts, bearings and gears are located at the feed-out end of the reservoir for raising the pans and are designated by similar reference numerals raised to the series 300.

Stands 155, 355, are fixed to and extend upwardly from the sector 69 of the base and are connected by a cross-brace 156. The stands are provided with upright bearings 157, in which shafts 158, 358, are respectively journaled. The shafts have pinions 159, 359, fixed at their upper ends, which mesh with the internal gear 50. Bevel-gears 160, 360, are fixed at the lower ends of said upright shafts and mesh with bevel-gears 161, 361, fixed to the inner ends of radially arranged shafts 162, 362, journaled respectively at their inner ends in bearings 163, 363, in said stands and at their outer ends in bearings 164, 364, in bearing-blocks 165, 365, on the outer portion of the segment base. The shaft 162 has sprocket-wheels 166, 167, fixed thereto. (Figs. 2, 3 and 4.)

Sprocket-chains 168, 169, are received about said sprocket-wheels 166, 167, respectively and about the sprocket-wheels 141, 148, for rotating the arms 128, 130. The shaft 362 has sprocket-wheels 366, 367, fixed thereto. Sprocket-chains 368, 369, are received about said sprocket-wheels and about the sprocket-wheels 341, 348, for rotating the arms 328, 330. (Figs. 2, 3 and 4.)

The rotary paths of the rollers 129, 131, 329, 331, are respectively such that at their upper limits they slightly raise the pans off of their supporting fingers sufficiently to permit ready retractive movement of the supporting fingers, and at the lower portions of their paths move away from the pans which have been lowered thereby into the molten bath and are supported by gravity on said molten bath.

In the present exemplification the turntable or rotary carrier has continuous rotation imparted thereto. As a pan arrives in a radial position proximate to the arms 128, 130, the said arms are ascending so that when the roller 110 contacts the cam-piece 115, for moving the supporting fingers out of the supporting relation, the pan will have been raised just sufficiently so that this movement of the supporting fingers may take place without undue friction or resistance. The arms then move in the descending portions of their paths for lowering the pan into the beginning portion of the reservoir.

When the pan has sunk into the molten bath sufficiently for proper heat transference thereto, the arms continue their descent while the pan is moved in a planetary path with the rotary carrier, the upper edge of the pan being above the level of the bath for preventing flow of the bath into the pan. The pans continue their planetary movements, and the rotations of the arms are so timed that when the next pan comes into a radial position at the beginning portion of the bath, the same operation takes place as to it.

The pan continues in its planetary movement along the reservoir until it arrives at the exit end of the reservoir, at which time the arms 328, 330, are moving in their upward paths for raising the pan out of the molten bath, the pan being sufficiently raised, when it arrives in radial position so that its roller 110 coacts with the cam-piece 123, that the supporting fingers move under the pan without undue friction, the arms then descending away from the pan, the pan being then supported by and moving with the rotary carrier.

It will be understood that the printing shell will have been placed in the pan by the time the pan is received in the bath and that the printing shell will by that time have been acid treated. A sheet of tin foil is also placed on the upwardly presented reverse face of the printing shell, the heat of the bath heating the printing shell and causing melting of the tin foil for providing the reverse face of the printing shell with a coating of tin so that the backing metal may properly adhere to the printing shell.

Figure 1:
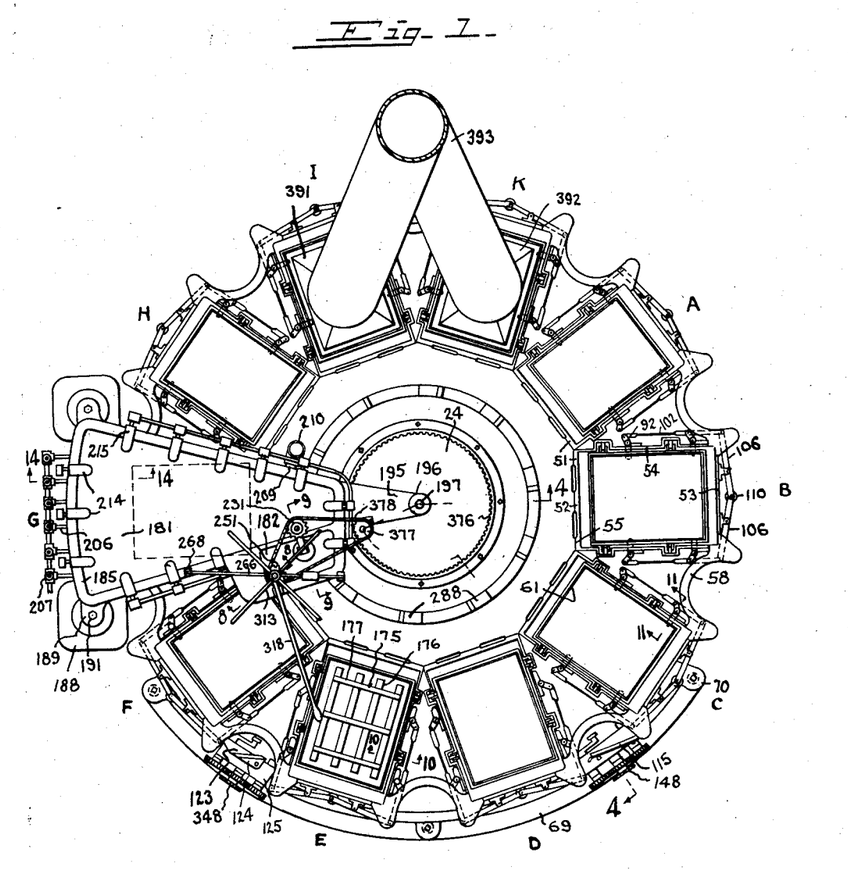
Fig. 1 is a plan view of my improved device.

In order that all portions of the printing surface of the shell may be held firmly to the bottom of the pan to produce a plane printing plate, a weight 175 is placed on the tin-foil and shell. The weight comprises bearing bars 176 and cross-bars 177. The cross-bars serve as handles. (Figs. 1 and 10.)

The weight may be a wood structure which is pressed and bears upon the tinned printing shell during the initial portion of the flowing of the backing metal upon the shell, which initial portion of the metal then forms a weight upon the thin shell, for insuring a flat printing plate, and preventing the seepage of backing metal under the shell to mar its printing face. The weight floats on the backing metal during the further flowing of the backing metal into the pan.

The backing metal is preferably floated on to the printing shell immediately after the same has left the molten bath and the flowing of this backing metal is also preferably accomplished automatically, adjusting means being provided for regulating the amount of backing material supplied to the pan. The adjustment of amount of backing metal supplied is preferably provided so as to form printing plates of various thicknesses, it being understood that the backing metal flows throughout the area of the pan regardless of whether the whole or only a part of the area of the pan is covered by the printing shell or printing shells therein, the surplus backing metal being trimmed and the printing plates being separated in well understood manner in the art after the castings have been removed from the pan.

In order to provide for evenness of flow of molten metal upon the printing shell, an auxiliary reservoir for molten backing metal is provided in which the level of the molten backing metal is kept constant for even gravity flow. A main reservoir is provided into which the backing metal is placed to be melted. A valve-controlled communicating channel is provided between the reservoirs, receiving its flow below the surface of the molten metal. The flow of molten metal for the pan is received through a valve-controlled port below the surface of molten metal in the auxiliary reservoir. Evenly molten metal is thereby supplied to the printing shell, and such molten metal so supplied is free from dross and impurities.

Means are also provided for maintaining the valves in proper condition for proper supply of molten metal and for regulating said supply.

A main reservoir 181 and an auxiliary reservoir 182 are provided, these reservoirs being preferably in an integral casting. This casting is supported by a housing 183 having a surrounding wall 184 of substantially the contour of the outer lateral wall of the combined reservoir casting, the reservoir being supported by this housing, as by having an upper peripheral flange 185 on the casting supported on the upper edge of the housing. (Figs. 1, 2, 8, 9 and 14.)

The outer end of the housing is supported on posts 186, the lower ends of which are received in sockets 187 of a base-piece 188 and the upper ends of which are received in bearings 189, 190, on the outer corners of the housing. Adjusting bolts 191 are threaded in threaded holes in the upper walls of the bearings 189 and bear upon the upper ends of the posts for adjusting the outer corners of the housing to elevation. The outer corners are clamped to the posts in adjusted positions by set-bolts 192. (Figs. 1, 2 and 3.)

The inner end of the housing is provided with an arm 195 which has a bearing 196. A post 197 has a lower threaded end 198 which is secured in a threaded hole in the main pedestal 22 and extends upwardly through a bearing 199 in the middle of the turn-table. The upper end of the post is threaded and has an adjusting nut 200 thereon. The bearing 196 is received about said upper threaded end of the post and is arranged to rest upon said nut. This nut together with the adjusting bolts 191 levels the main and auxiliary reservoirs. (Figs. 1, 2 and 4.)

Figure 9:
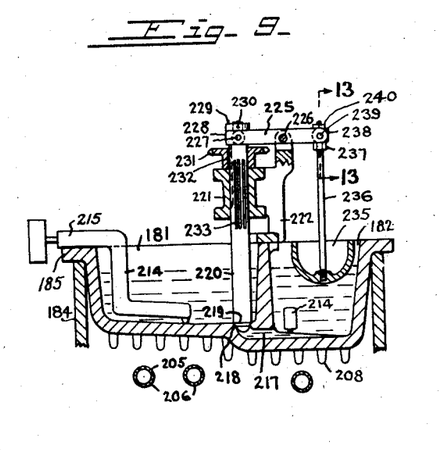
Fig. 9 is a vertical section of the valve mechanism for the valve of the main reservoir, taken on the line 9—9 of Fig. 1.
Figure 14:
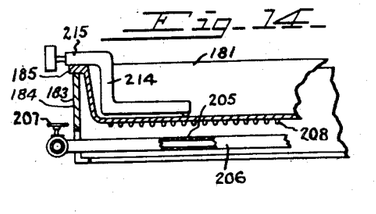
Fig. 14 is a detail view of the main reservoir, taken in section on the line 14—14 of Fig. 1, and partly broken away.

These reservoirs are suitably heated, as by means of gas jets from gas orifices 205 in pipes 206 (Figs. 9 and 14) provided with regulating valves 207. The bottom of the reservoirs may be provided with depending projections 208 for aiding in heat transference. The burners are located between the outer walls of the housing 183 under the reservoirs. This housing may be provided with a flange opening 209 arranged to connect with a suitable pipe 210 for carrying off the products of combustion. (Figs. 1, 9 and 14.)

It is preferred, however, to heat the backing metal by means of suitable electric heating elements 214 let into the reservoir at suitable points and having branches 215 in which suitable electric conductors are located, connecting with a suitable source of electric energy and provided with proper and suitable switches and with suitable automatic heat controlling devices for maintaining the temperature of the molten material. The outer walls of the reservoirs may be suitably heat-insulated, which heat-insulation is however not shown. (Figs. 1, 2, 9 and 14.)

A passage 217 is between the main reservoir and the auxiliary reservoir at the bottoms of said reservoirs. The entrance end of said passage in the main reservoir is provided with a valve-seat 218. A valve 219 coacts with this seat and is provided with a valve-stem 220 in a bearing 221 on a stand 222 extending from the partition wall between said reservoirs. A lever 225 has a pivot 226 on said stand and is pivoted by pivot-bolts 227 to a collar 228 about said valve-stem. A collar 229 is adjustably secured to said valve-stem by a set-screw 230, the collar 228 being arranged to raise the valve-stem by means of the collar 229. (Figs. 1, 2 and 9.)

The valve-stem is normally rotated by a sprocket-wheel 231 having spline key and groove connection 232 with said valve-stem for permitting axial movement of the valve-stem in the sprocket-wheel. This rotation is provided for continuously maintaining the valve and valve-seat in ground relation and avoiding the lodgement of impurities between the valve and valve-seat. The valve-stem is also preferably provided with grooves forming sharp-edged ribs 233 extending lengthwise of the valve-stem for maintaining the journal relation between the valve-stem and its bearing clear and free from obstruction, impurities and chilled material. (Fig. 9.)

Figure 13:
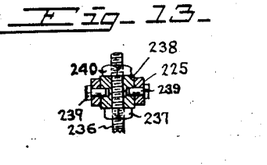
Fig. 13 is a cross-sectional detail view, taken on the line 13—13 of Fig. 9.

A float 235 is received in the molten metal in the auxiliary reservoir and is provided with a rod 236. The upper end of the stem is threaded. An adjusting nut 237 is received thereabout. A collar 238 is pivoted by pivot-bolts 239 to the lever 225 and is received about the upper end of the float-rod above the adjusting nut, a nut 240 being received about the upper end of said threaded portion above the pivoted collar for holding the float-rod to said collar. The float is preferably dished or hollow and is made of such material, for instance cast iron, lighter than the backing metal so as to float thereon (Figs. 9 and 13.)

When backing metal flows out of the auxiliary reservoir the level of said backing metal is lowered, thereby lowering the float and opening the valve 219 for permitting flow of backing metal from the main reservoir into the auxiliary reservoir for restoring the level of backing metal in the auxiliary reservoir, thereby raising the float and again closing the valve and insuring substantially constant level of backing metal in the auxiliary reservoir.

Figure 8:
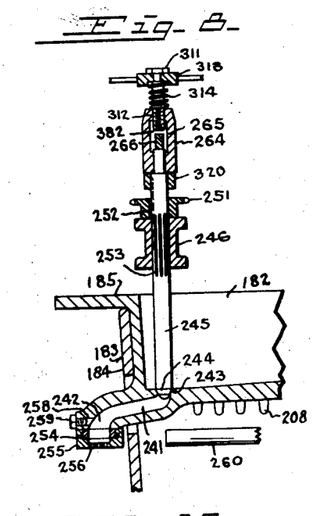
Fig. 8 is a vertical section of the valve mechanism for the valve of the auxiliary reservoir, taken on the line 8—8 of Fig. 1, and partly broken away.
Figure 12:
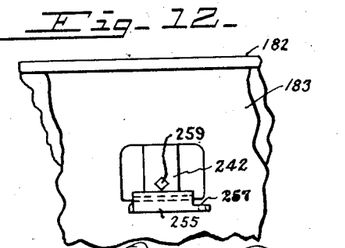
Fig. 12 is a side elevational view of a detail of the pouring spout and its related parts, partly broken away.

A feed-passage 241 connects with the bottom of the auxiliary reservoir and is continued in a spout 242 discharging above the path of the pans. There is a valve-seat 243 in the bottom of the auxiliary reservoir with which a valve 244 coacts. This valve is on a stem 245 in a bearing 246 of a stand 247 (Fig. 2) extending upwardly from the wall of the auxiliary reservoir. A sprocket-wheel 251 has spline key and groove connection 252 with the valve-stem for rotating the valve to insure continuous proper seating between the valve and its seat. The valve-stem is provided with grooves forming sharp-edged ribs 253 extending lengthwise of the stem for insuring continuous proper journal connection between the stem and its bearing. (Figs. 2, 8 and 12.)

The mouth of the spout 242 is provided with a guide 254 for a slide 255. The slide is in the form of a box whose bottom is provided with perforations 256 serving as a strainer for the molten metal and for spreading the molten metal gently over a considerable area in flowing the molten metal into the pan and preventing disarrangement of the parts in the pan. (Figs. 8 and 12.)

The slide has a lug provided with a hole 257 for reception of a hook for removing the slide for cleaning. The spout is provided with a cleaning hole 258 in line with its passage arranged to receive a cleaning stem. The hole is normally closed by a plug 259. (Figs. 8 and 9.)

A gas-jet from a burner 260 is directed upon the spout for preventing chilling of the metal being delivered. The burner is regulated by a suitable valve. (Fig. 8.)

A yoke 264 is fixed to the upper end of the valve-stem 245. It is provided with a slot 265 through which a lever 266 extends. The lever is pivoted on a pivot-pin 267 in a stand 268 extending upwardly from the wall of the reservoir. The other end of the lever has articulation 269 with a forked rod 270. The forked rod has adjustable connection with a slide 271 slidable in an upright guide 272 secured to the wall of the housing 183. (Figs. 1, 2, 8 and 15.)

The lower threaded end 275 of the rod is adjustable axially in a threaded lug 276 on the slide, the articulation 269 being restored after adjustment. (Figs. 2, 15, 16 and 17.)

A fork 277 is pivoted on a pin 278 in a lug 279 on the slide and has a bearing 280 which is threaded. The threaded stem 281 of a fork 282 is adjustably received in this bearing and held in adjusted position by a jam-nut 283. A roller 284 is journaled in the fork 282. (Figs. 2, 15, 16, 17 and 18.)

Figure 19:
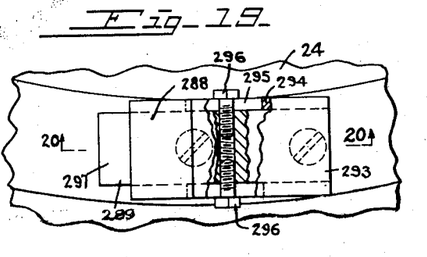
Fig. 19 is a detail plan view of one of the traveling cam means for automatically actuating the valve of the auxiliary reservoir, partly broken away; and, Fig. 20 is a vertical section of the same, taken on the line 20—20 of Fig. 19, and partly broken away.
Figure 20:
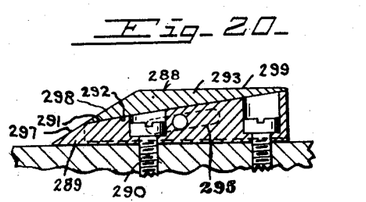

The rotary carrier is provided with a series of cams 288 arranged to contact the roller and thereby raise the roller momentarily for opening the valve 244 when a pan is received under the feed-spout 242. There is a series of these cams arranged in radial relations on the rotary carrier corresponding to the positions and number of pans. (Figs. 1, 19 and 20.)

These cams are preferably adjustable for adjusting the moment and the extent of opening of the valve. Each of the cams preferably comprises a lower block 289 secured to the rotary carrier or turn-table by bolts 290. This block is provided with an incline 291 with which an incline 292 on an upper block 293 coacts. The upper block has side-flanges 294, each of which is provided with an inclined slot 295, clamp-bolts 296 being received through said slots and threaded in the lower block for clamping the upper block to the lower block in adjusted positions. The blocks are provided with inclined riding faces 297, 298, for the roller 284 and the block 293 is provided with an upper riding face 299 for said roller. The closing of the valve is abrupt by the dropping of the roller off of the abrupt end of the cam. (Figs. 19 and 20.)

Figure 15:
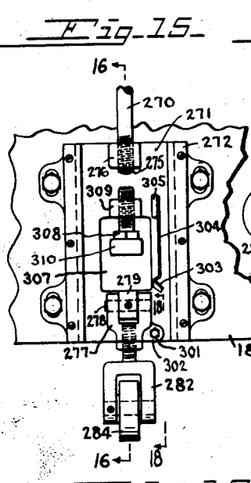
Fig. 15 is a front elevation of the controlling slide for automatically controlling actuation of the valve of the auxiliary reservoir, partly broken away.
Figure 18:
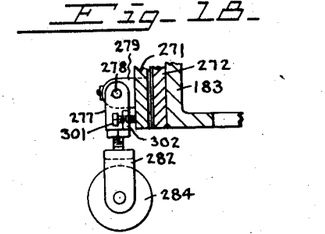
Fig. 18 is a detail view of the same, taken in section on the line 18—18 of Fig. 15.

The position of the roller 284 is adjustable with relation to the cams. Thus a set-bolt 301 is threaded in a threaded lug 302 on the fork 277 and bears against the slide. Adjustment of the set-bolt adjusts the fork on its pivot and moves the roller in an arc toward or from the plane of the slide and the path of the cams for varying the moment and extent of opening of the valve 244. (Figs. 15 and 18.)

Figures 16, 17:
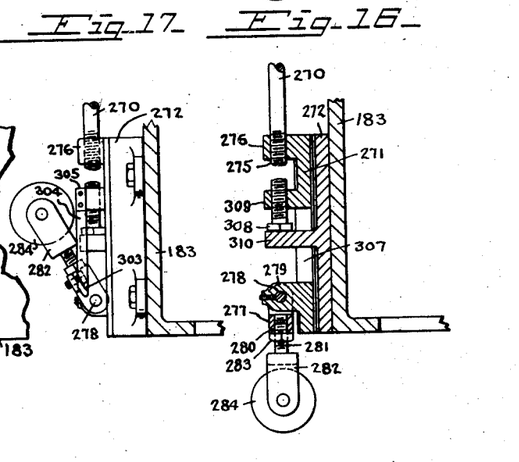
Fig. 16 is a vertical section of the same, taken on the line 16—16 of Fig. 15.
Fig. 17 is an edge view of the same with the controlling roller in raised position.

If it is desired to interrupt the feeding of the backing material into the pans or to rotate the turn-table under the spout 242 without feeding into the pans, the roller 284 is raised out of range of the cams 288 by swinging the fork 282 thereon upwardly on its pivot 278, and, if it is desired to continue such interruption, the fork is swung up sufficiently and received over a latch 303 on a leaf spring 304 fixed to a lug 305 on the slide. (Figs. 15 and 17.)

The firmness of seating of the valve may be adjusted by an adjustable stop 308, shown as a bolt threaded in a threaded lug 309 on the slide and arranged to contact a lug 310 on the guide 272 extending through a slot 307 in the slide. This adjustable stop limits descent of the slide and consequently adjustably limits descent of the valve 244. (Figs. 2, 15 and 16.)

An adjusting screw 311 is adjustable in a threaded hole 312 in the upper wall of the yoke 264. The adjusting screw has an adjusting wheel 313 thereon, the arms of which are within easy reach of the operator at the casting position. A pressure spring 314 surrounds the screw and is located between the yoke and the adjusting wheel for exerting friction upon the screw and avoiding too ready rotation thereof. (Figs. 1, 2 and 8.)

The lever 266 may also be provided with a weight 315 for urging seating of the valve 244. (Figs. 1 and 2).

If desired, the valve 244 may be manually operated by a lever 318 pivoted on a pin 319 on the stand 222 on the wall of the auxiliary reservoir and provided with a fork 320 contacting the lower end of the yoke 264, the lever being provided with a handle 321 for operating the same manually if it is desired to feed molten backing material under manual control. (Figs. 1, 2 and 8.)

An upright shaft 372 is journaled in bearings 373, 374, on the housing 183. A pinion 375 is fixed to said shaft and meshes with an internal gear 376 fixed to the turn-table. A sprocket-wheel 377 is fixed to the upper end of the shaft. (Figs. 1, 2 and 4.) A sprocket-chain 378 is received about the sprocket-wheel and the sprocket-wheels 231, 251, which are spline-keyed and grooved to the valve-stems 220, 245, for rotating said valve-stems, and thereby insuring freedom of said stems in their bearings for preventing sticking of the valve-stems in opening or closing the valves and for preventing lodgment of dirt between the valves and valve-seats and insuring proper seating of the valves.

The rotary carrier is exemplified as provided with ten pans which are represented as continuously travelling past various stations about the carrier at which various operations may be performed. The stations may be exemplified for instance as A, B, C, D, E, F, G, H, I and K. (Fig. 1.) The electro-deposited shell 81 may be placed on the pan with its printing face down at the station A and the back thereof have a film of acid applied thereto at the station B. A film of tin-foil 381 may be laid on the shell at the station C.

The pan is then lowered into the molten bath by retraction of the fingers 91 by coaction between the roller 110 and the cam 115, and the rotation of the arms 128, 130. Upon arrival at the station D the pan will have been lowered into the molten bath for heating the pan, the shell thereon and the acid and tin-foil on the shell for melting the latter and causing it to adhere to the reverse face of the shell. The weight 175 may be applied to the tin-foil and shell at this station.

The pan is floated on the top of the molten bath through the station E, being pushed by the lower ends of the guides 86, and is then raised out of the molten bath by the arms 328, 330, and the swinging of the fingers 91 under the pan by coaction of the roller 110 with the cam 123.

Such manipulation of the shell or shells, of the tin-foil and of the weight 175 as may be desired may take place during travel of the pan through the stations D, E and F.

When the advancing inner corner of the pan arrives at the spout 242, one of the cams 288 engages the roller 284 for raising the slide 271 and the lever 266 for raising the valve 244 and causing flow of the backing material through the spout and its strainer upon the shell or shells in the pan. This backing material spreads throughout the back of the shell or shells and throughout the pan, as much of the backing material being fed into the pan as to provide the desired given thickness of backing material upon the shell or shells or in the pan.

The moment and extent of actuation of the slide 271 is adjusted by adjustment of the upper cam-block 293 upon the lower cam-block 289, or by adjustment of the set-bolt 301.

The moment of elevation of the valve 244 by the slide is adjusted by adjustment of the screw 311. Adjustment of this screw upwardly provides a space 382 between the lever 266 and the lower end of the screw. (Fig. 8.) The movement of the lever through this space is idle as far as the valve is concerned, the valve being opened upon contact of the lever with the end of the screw. This adjustment regulates the duration of flow of the backing material from the spout and regulates the thickness of the plate which is formed in the pan. If a thin plate is desired the screw 311 is raised by means of the hand-wheel 313. If a thick plate is desired the screw is lowered by means of said hand-wheel.

The degree of seating of the valve may also be regulated, as by adjusting the adjustable stop 308 in its lug on the slide, the adjustable stop coacting with the stop 310 on the guide, for adjusting the contact between the lower face of the lever 266 and the lower wall of the slot 265 in the yoke 264.

The pan travels as the molten backing material flows thereinto, the roller 284 dropping off of the cam before the pan passes from under the spout for closing the valve and shutting off the flow of molten material.

The pan with its charge of molten material then passes past station G under the melting pot, the pan further passing the stations H, I and K.

The pan is at these various latter stations subjected to a blast of cooling air through spouts 385, 386, and 387, fed from a pipe 388, these spouts being under the pans. Spouts 391, 392, fed from pipes 393 may discharge cooling air upon the tops of the pans and the plates therein. (Figs. 2 and 3.) When the plate arrives at the station K it will have been sufficiently cooled to permit its removal without distortion.

The plate being removed, the pan from which it is removed is ready for receiving a fresh shell which is supplied at the station A, or, if desired, at the station B, the pan being first scraped and cleaned so as to remove any loose metal or foreign substances there may be in the pan, the pan being also preferably oiled, as by wiping the same with an oiled cloth.

Having thus fully described my invention, what I claim as new, and desire to secure by Letters Patent, is:

1. In an apparatus for backing printing shells, the combination of a series of pans for receiving the printing shells, means for moving said pans in a path, heating means in the vertical plane of a portion of said path, pan lowering means at the beginning portion of said heating means, pan raising means at the end portion of said heating means, and discharging means for backing material complemental to said pans.

2. In an apparatus for backing printing shells, the combination of a series of pans, a reservoir for a molten bath, means for moving said pans into the vertical plane of said reservoir, pan lowering means at the beginning portion of said reservoir, pan raising means at the end portion of said reservoir, discharging means for backing material complemental to said pans, and automatic control means for said discharging means.

3. In an apparatus for backing printing shells, the combination of a movable carrier, pans therefor, a reservoir for a molten bath under a portion of the path of said pans, pan lowering means at the beginning portion of said reservoir, pan raising means at the end portion of said reservoir, synchronized operating means for said lowering means and said raising means, and discharging means for backing material complemental to said pans.

4. In an apparatus for backing printing shells, the combination of a movable carrier, pans therefor, supporting means normally supporting said pans in elevated positions, a reservoir for a molten bath under a portion of the path of said pans, pan lowering means at the beginning portion of said reservoir, means at the beginning portion of said reservoir moving said supporting means out of supporting relation, pan raising means at the end portion of said reservoir, means at the end portion of said reservoir moving said supporting means into pan supporting relation, and synchronized operating means for said lowering means and said raising means.

5. In an apparatus for backing printing shells, the combination of a movable carrier, pans therefor, supporting means normally supporting said pans in elevated positions, a reservoir for a molten bath under a portion of the path of said pans, pan lowering means at the beginning portion of said reservoir, means at the beginning portion of said reservoir moving said supporting means out of supporting relation, means for rendering said last-named means inactive, pan raising means at the end portion of said reservoir, means at the end portion of said reservoir moving said supporting means into pan supporting relation, and synchronized operating means for said lowering means and said raising means.

6. In an apparatus for backing printing shells, the combination of a movable carrier, pans therefor, a reservoir for a molten bath under a portion of the path of said pans, means for guiding said pans in down and up paths into and out of said bath, pan lowering means at the beginning portion of said reservoir, pan raising means at the end portion of said reservoir, synchronized operating means for said lowering means and said raising means, and discharging means for backing material complemental to said pans.

7. In an apparatus for backing printing shells, the combination of a movable carrier, pans therefor, a reservoir for a molten bath under a portion of the path of said pans, means for guiding said pans in down and up paths into and out of said bath, rotatable arms at the beginning portion of said reservoir, rotatable arms at the end portion of said reservoir, said arms complemental to said pans, and synchronized operating means for said arms rotating said first-named arms in downward paths and said second-named arms in upward paths respectively at the beginning portion and at the end portion of said reservoir during coincident positioning of said pans by movement of said carrier respectively at said beginning portion and said end portion of said reservoir.

8. In an apparatus for backing printing shells, the combination of a rotatable carrier, pans therefor, a reservoir for a molten bath under a portion of the planetary path of said pans, automatic means causing descent of said pans into said bath at the beginning portion of said reservoir and ascent of said pans out of said bath at the end portion of said reservoir during planetary movement of said pans, and discharging means for backing material complemental to said pans.

9. In an apparatus for backing printing shells, the combination of a rotatable carrier, pans therefor, a reservoir for a molten bath under a portion of the planetary path of said pans, automatic means causing descent of said pans into said bath at the beginning portion of said reservoir and ascent of said pans out of said bath at the end portion of said reservoir during planetary movement of said pans, supporting means on said carrier normally supporting said pans in raised positions, means at the beginning portion of said reservoir moving said supporting means into non-supporting relation, means at the end portion of said reservoir moving said supporting means into supporting relation and discharging means for backing material complemental to said pans.

10. In an apparatus for backing printing shells, the combination of a rotatable carrier, pans therefor, a reservoir for a molten bath under a portion of the planetary path of said pans, automatic means causing descent of said pans into said bath at the beginning portion of said reservoir and ascent of said pans out of said bath at the end portion of said reservoir during planetary movement of said pans, supporting means on said carrier normally supporting said pans in raised positions, means at the beginning portion of said reservoir moving said supporting means into non-supporting relation, means rendering said last-named means inactive, and means at the end portion of said reservoir moving said supporting means into supporting relation.

11. In an apparatus for backing printing shells, the combination of a movable carrier, pans thereon, heating means for said pans, a reservoir for backing material, said reservoir provided with an exit-port complemental to said pans, a valve for said port, a lever having operative connection with said valve, means for adjusting said operative connection for regulating the duration of open relation of said valve, a slide having operative connection with said lever, and means on said rotary carrier intermittently operating said slide.

12. In an apparatus for backing printing shells, the combination of a movable carrier, pans thereon, heating means for said pans, a reservoir for backing material, said reservoir provided with an exit-port complemental to said pans, a valve for said port, a lever having operative connection with said valve, means for adjusting said operative connection for regulating the duration of open relation of said valve, a slide having operative connection with said lever, means for adjusting the movement of said slide for adjusting the seating relation of said valve, and means on said rotary carrier intermittently operating said slide.

13. In an apparatus for backing printing shells, the combination of a rotary carrier provided with openings, pans in said openings, a reservoir for a molten bath under a portion of the planetary path of said pans, the walls of said openings provided with guides for down and up movements of said pans, means at the beginning portion of said reservoir for lowering said pans on said guides for floating said pans on said bath, said guides coacting with said pans for pushing said pans along said bath with the rotary movement of said carrier, means at the end portion of said reservoir for raising said pans, and discharging means for backing material complemental to said pans.

14. In an apparatus for backing printing shells, the combination of a rotary carrier provided with openings, pans in said openings, a reservoir for a molten bath under a portion of the planetary path of said pans, the walls of said openings provided with guides for down and up movements of said pans, movable supporting means on said carrier at said openings, means at the beginning portion of said reservoir moving said supporting means out of supporting relation with said pans, means at the beginning portion of said reservoir for lowering said pans on said guides for floating said pans on said bath, said guides coacting with said pans for pushing said pans along said bath with the rotary movement of said carrier, means at the end portion of said reservoir for raising said pans out of said bath, means at the end portion of said reservoir moving said supporting means into supporting relation with said pans, and discharging means for molten material complemental to said pans.

15. In an apparatus for backing printing shells, the combination of a rotary carrier comprising a central supporting portion, frames radiating from said central supporting portion and having spaces therebetween at their outer ends, and spanner-pieces secured to proximate corners of adjacent frames and spanning said spaces, said frames provided with openings, pans supported in said openings, heating means for said pans, and discharging means for backing material complemental to said pans.

16. In an apparatus for backing printing shells, the combination of a series of pans for receiving printing shells, moving means for moving said pans in a path, a reservoir for backing material for said shells, a discharge port therefor, a valve for said port, means for rotating said valve, and means for operating said valve having connection with said moving means.

17. In an apparatus for backing printing shells, the combination of a series of pans for receiving printing shells, moving means for moving said pans in a path, a reservoir for backing material for said shells, a discharge port therefor, a valve for said port, a stem for said valve, a bearing for said stem, means for rotating said stem, means for reciprocating said stem having connection with said moving means, and cleaning ribs extending lengthwise of said stem in said bearing.

18. In an apparatus for backing printing shells, the combination of a rotary carrier, pans therefor, a main reservoir, an auxiliary reservoir, a connecting passage between said reservoirs, a port therefor, a port for said auxiliary reservoir complemental to said pans, reciprocating valves for said ports, and means for rotating said valves having operative connection with said rotary carrier.

19. In an apparatus for backing printing shells, the combination of a rotary carrier, pans therefor, a main reservoir, an auxiliary reservoir, a connecting passage between said reservoirs, a port therefor, a port for said auxiliary reservoir complemental to said pans, reciprocating valves for said ports, means for rotating said valves having operative connection with said rotary carrier, said valves provided with valve-stems, bearings for said valve-stems, and cleaning ribs extending lengthwise of said stems in said bearings.

20. In an apparatus for backing printing shells, the combination of a rotary carrier, pans therefor, a reservoir for a molten bath, movable means for supporting said pans on said carrier, rotatable arms at the beginning portion and at the end portion of said reservoir respectively for lowering said pans into said bath and for raising said pans out of said bath, means for rotating said rotary carrier, means driven by said rotary carrier for rotating said arms, a cam at the beginning portion of said reservoir for moving said movable means away from said pans, and a cam at the end portion of said reservoir for moving said movable means into pan supporting relation.

21. In an apparatus for backing printing shells, the combination of a rotatable carrier, pans therefor, a reservoir for backing material for said shells, a discharge port therefor, a valve for said port, an actuator for said valve comprising a contact-part, a series of contact-parts for the latter on said carrier, and means whereby to place said first-named contact-part in inactive relation for maintaining closed relation of said valve.

22. In an apparatus for backing printing shells, the combination of a rotary carrier, pans therefor, a reservoir for backing material for said shells, a discharge port therefor, a valve for said port provided with a valve-stem, a yoke on said stem, a lever having spaced connection with said yoke, an adjusting screw for adjusting the spacing of said connection, a slide having operative connection with said lever, a contact-part on said slide, and a series of contact-parts for the latter on said carrier.

In testimony whereof, I have hereunto signed my name.

FRANK X. TEMMEN.